United States Patent [19]

McDermott

[11] Patent Number: 4,567,587
[45] Date of Patent: Jan. 28, 1986

[54] MULTIPLEX EQUIPMENT MONITORING APPARATUS

[75] Inventor: Thomas C. McDermott, Plano, Tex.

[73] Assignee: Rockwell International Corporation, El Segundo, Calif.

[21] Appl. No.: 565,261

[22] Filed: Dec. 27, 1983

[51] Int. Cl.[4] .............................. H04J 1/16; H04J 3/06
[52] U.S. Cl. ...................................... 370/13; 370/100; 371/49
[58] Field of Search ................... 370/13, 17, 100, 102; 371/49

[56] References Cited
U.S. PATENT DOCUMENTS

4,063,040 12/1977 Fontanes et al. .................... 370/102
4,071,887 1/1978 Daly et al. ........................... 370/102
4,326,291 4/1982 Marsh et al. ........................... 371/49
4,387,456 6/1983 Creteav ................................... 370/13

Primary Examiner—Douglas W. Olms
Assistant Examiner—Curtis Kuntz
Attorney, Agent, or Firm—Bruce C. Lutz; V. L. Sewell; H. Fredrick Hamann

[57] ABSTRACT

Monitoring or error checking equipment for use with multiplexing circuitry at the transmission end of a communication line is disclosed which accomplishes a large reduction in circuitry by using transmitter generated low speed timing signals and clock signals to demultiplex the output data into nonsymmetrical or timing irregular data. The plurality of channels of nonsymmetrical data are then each checked for parity and framing pulses as well as clock activity by time multiplexed switching equipment on a cyclical basis.

5 Claims, 6 Drawing Figures

MULTIPLEX EQUIPMENT MONITORING APPARATUS

The present invention is concerned generally with electronics and more specifically with error detecting equipment. Even more specifically, the present invention is concerned with an approach to monitoring multiplexing equipment for data generation errors at the transmitting end whereby the timing signals from the multiplexer may be used to eliminate the considerable amount of circuitry that would normally be required for resynthesizing these signals to accomplish the demultiplexing function preparatory to the frame signal, clock activity and parity checking.

The prior art approach to monitoring the output of a multiplex operation has used an independent set of equipment for demultiplexing the constituent parts of the data including synthesis of various clocking signals, etc., for the demultiplexing operation required prior to the checking of the data. To properly demultiplex three channels of data, especially where the data has stuff bits and other overhead bits, without introducing synchronization problems required a large amount of circuitry for checking each of the three channels.

The present inventive concept reduces the amount of circuitry by using the timing signals generated by the multiplex generator. Further parts are saved by doing the monitoring or checking on a multiplex type basis so that the same circuitry can be used to check each of the three channels in succession. Further circuitry is saved by demultiplexing the data only to the point of nonsymmetrical data and not worrying about recovering the data in the symmetrical form. This last step of not requiring the data to be smoothed eliminates the circuitry comprising an elastic buffer and phased locked loop circuitry.

With the above in mind, it is an object of the present invention to provide improved multiplex equipment malfunction detection circuitry.

Other objects and advantages of the present invention will be ascertained from a reading of the specification and appended claims in conjunction with the drawings wherein:

FIG. 3 1s a block diagram of the data framing and parity checking portion of the block diagram of FIG. 1;

FIG. 4b comprises a set of waveforms illustrating the signals found in the circuit of FIG. 4a.

DETAILED DESCRIPTION

Figure 1:
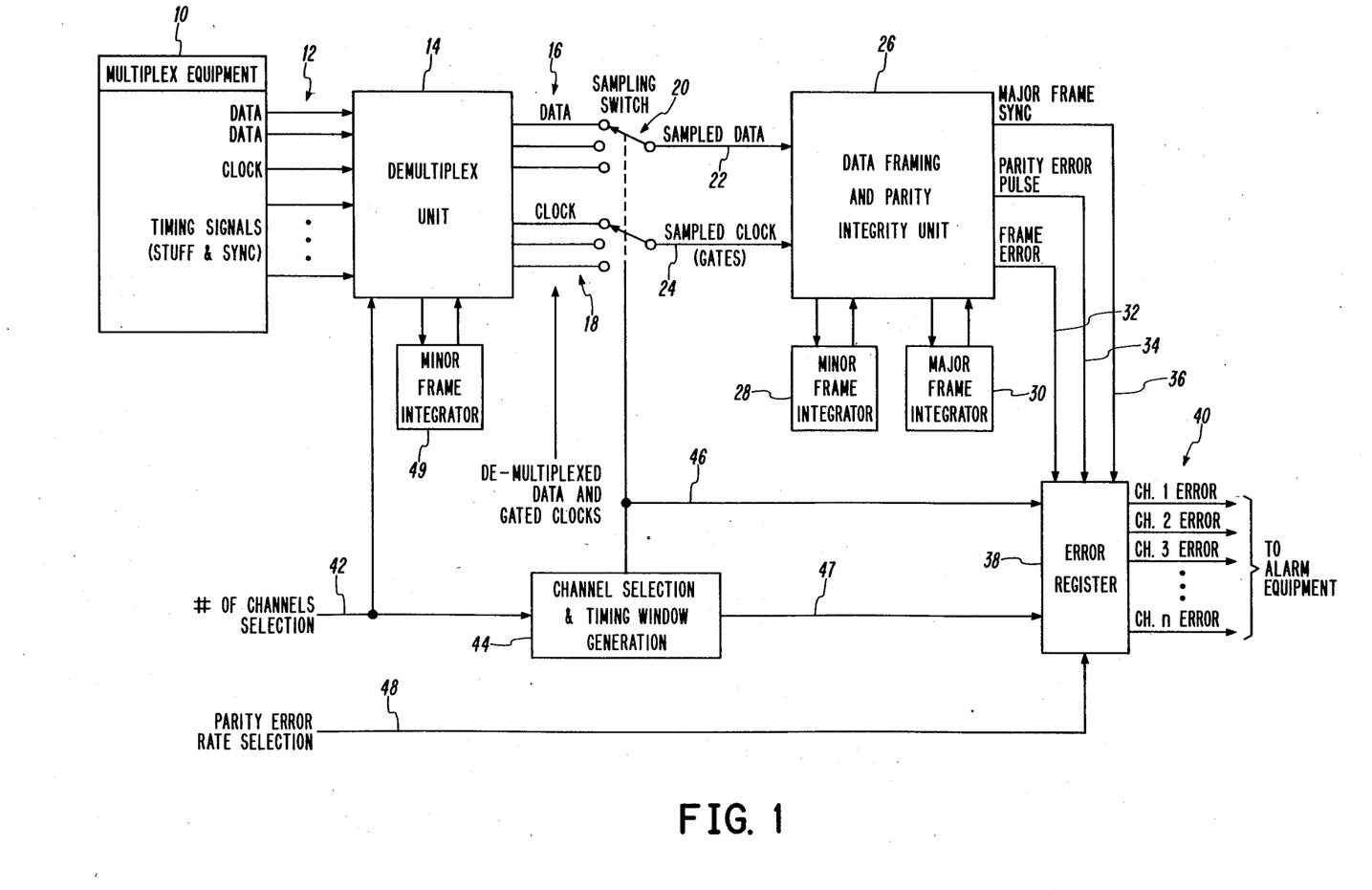
FIG. 1 is a block diagram of the overall inventive concept.

In FIG. 1 a block 10 represents the multiplex equipment which is being monitored by the present invention. The multiplex equipment generates certain clock and timing signals used in multiplexing the output data and all of these signals including the data signals are supplied on a plurality of leads 12 to a demultiplex unit block 14. The demultiplex unit 14 has a series of output data leads 16 and a series of output clock leads 18 each corresponding to one of the data leads 16. A sampling switch 20 selects between corresponding data and clock leads on a time multiplexed basis and supplies this information on a sampled data lead 22 and a sampled clock lead 24 to a data framing and parity integrity unit or block (sometimes referred to as a violation monitor and removal gate array) 26. The unit 26 is connected to a minor frame integrator block 28 and to a major frame integrator 30. A plurality of leads 32, 34 and 36 provide framing error, parity error pulse, and major frame sync signals respectively, to an error register 38 which has a set of output leads generally indicated as 40 which is connected to appropriate alarm equipment for indicating error on a specific channel of data.

Although the embodiment shown in more detail is designed to handle three channels of data, the inventive concept is not so limited and as shown, register 38 has n output leads. As also not illustrated in the detailed block diagrams, the unit can be configured to select between various numbers of channels of data. This information is input on lead 42 to both the demultiplex unit 14 and to a channel selection block 44. An output of block 44 is used on a lead 46 to operate the sampling switch 20 and to direct input signals to the error register 38 to the appropriate output lead 40. A parity error rate selection lead 48 provides another optional input signal to error register 38 for the purpose of selecting the number of detected parity errors necessary to be counted to generate an output signal. In the detailed disclosure, this was strapped to five.

Figure 2:
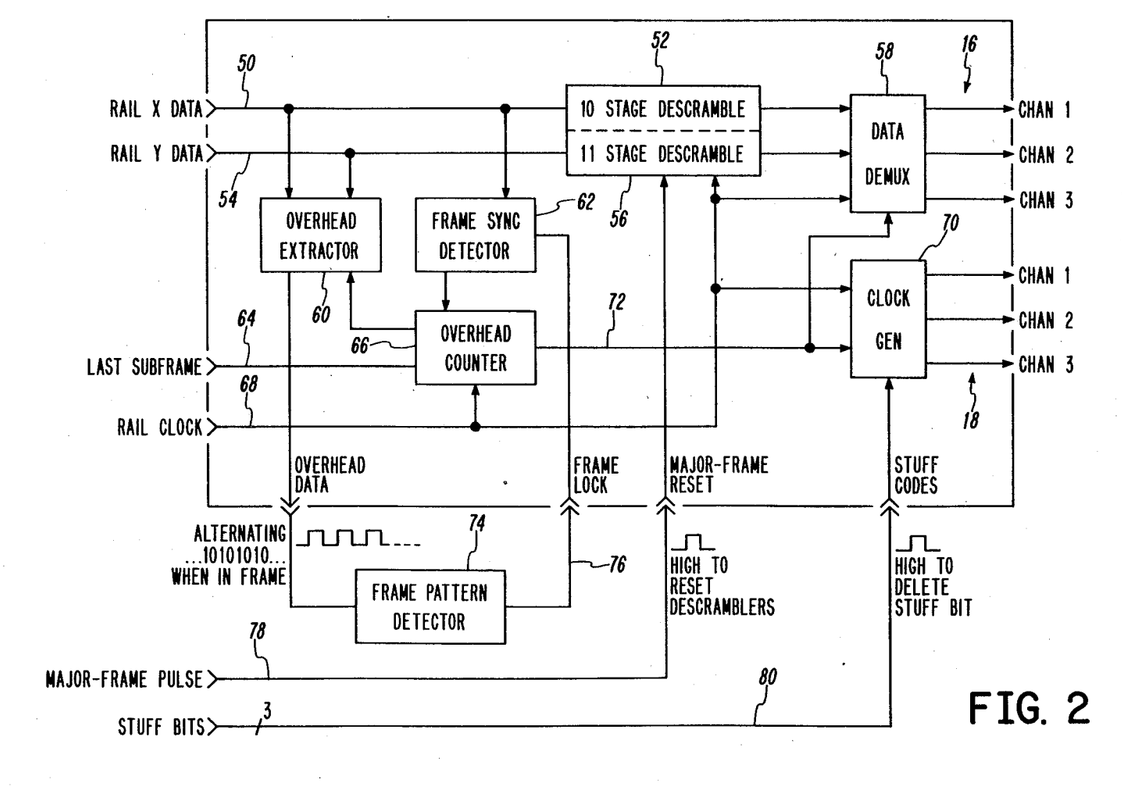
FIG. 2 is a block diagram of the demultiplexing section of FIG. 1.

FIG. 2 provides more detail as to the contents of demultiplex unit 14. As illustrated, rail X data is input on a lead 50 to a 10 stage descramble block 52 while a Y rail data lead 54 supplies signals to an 11 stage descramble unit 56. These two rails of descrambled information are then supplied from units 52 and 56, respectively, to a data demodulator or demux block 58 which provides three channels of output data on a set of leads 16. The two data leads 50 and 54 are also connected to supply signals to a block 60 labeled overhead extractor. The signals on the X rail data lead 50 are also supplied to a frame sync detector 62. A last subframe lead 64 supplies signals to an overhead counter 66 which also receives signals from the frame synchronization detector 62. A rail clock lead 68 from the multiplex equipment supplies clock signals to the overhead counter 66 as well as to the combination descramble units 52 and 56 and the demultiplex 58 along with the clock generator 70. An output of the overhead counter 66 is supplied on a lead 72 to a further input of data demultiplex block 58 and to an input of clock generator 70. Clock generator 70 supplies three channels of output clocks generally indicated as 18. A frame pattern detector block 74 receives overhead data from the overhead extractor block 60 and supplies frame lock data on a lead 76 to the frame sync detector 62. The frame pattern detector 74 accomplishes the same function as minor frame integrator 49 of FIG. 1. A further lead 78 supplies major frame reset pulses to the combination descramble unit 52–56. Stuff bit indicating signals are supplied on 3 separate lines generally designated as 80 to the clock generator 70. When the logic level of one of the leads is high, it indicates to the clock generator 70 that a stuff bit is occurring and should be deleted.

Figure 3:
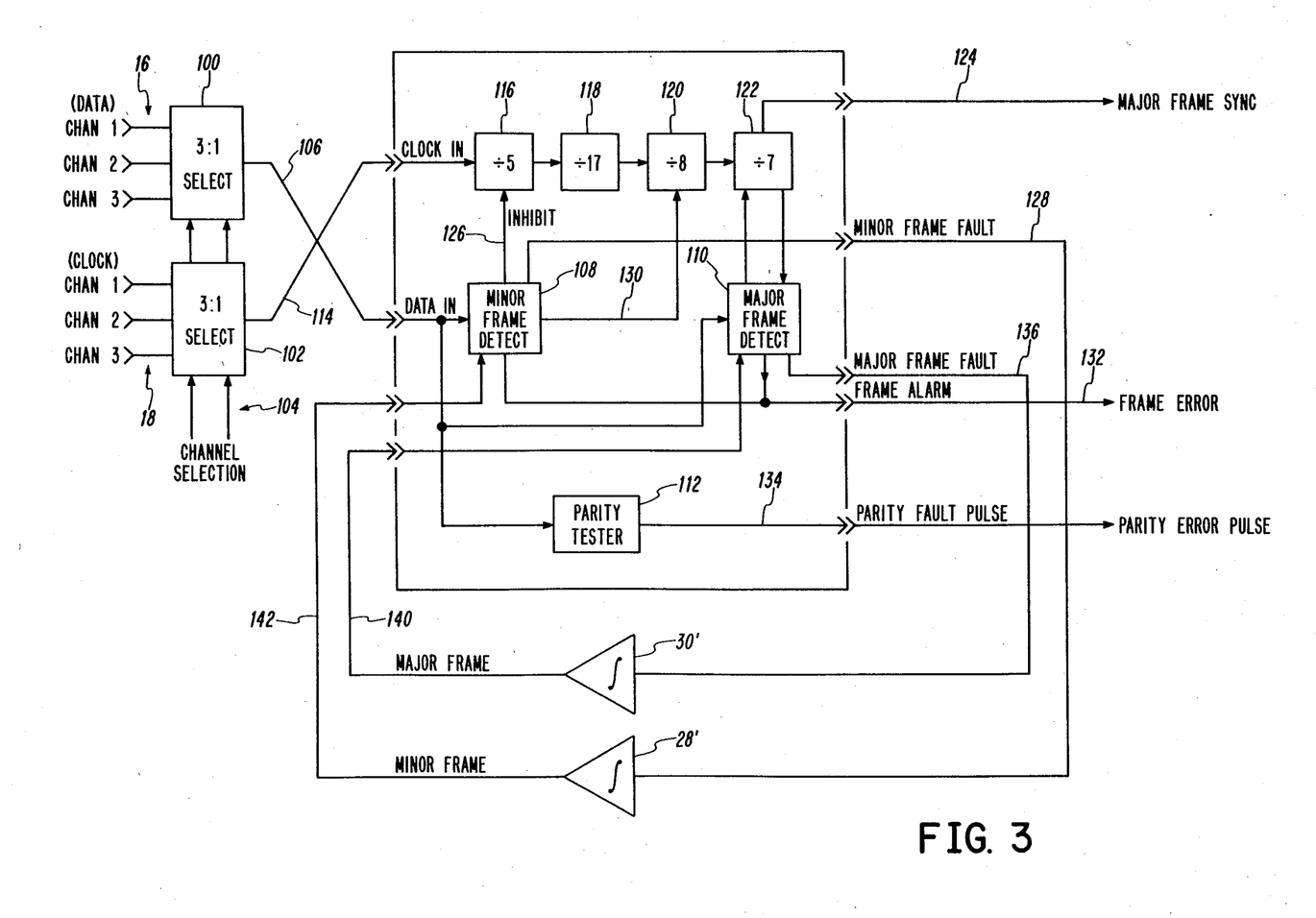

The circuitry of FIG. 3 provides more detail as to the contents of blocks 26, 28 and 30 of FIG. 1.

In FIG. 3 the three channels of data and three clock channels 16 and 18, respectively, are supplied to demultiplexing blocks 100 and 102, respectively, for selecting one of the three channels and the associated clock. The two blocks 100 and 102 receive the select channel number indications from a plurality of leads 104. An output of selector block 100 is supplied on lead 106 to a minor frame detector block 108, a major frame detector block 110 and a parity tester 112. The selected clock signal from block 102 is supplied on a lead 114 to a divide by 5 block 116. This clock is divided by a divide by 17 clock 118, divide by 8 clock 120 and a divide by 7 block 122 for the purpose of providing a major frame sync signal on an output lead 124. The minor frame detect block 108 provides an inhibit signal to the divider 116 on a lead 126 and provides a minor frame fault signal on a lead 128 to block 28 labeled as is shown in FIG. 1. The detector 108 also provides a control signal on a lead 130 to the divide by 8 block 120 and provides a frame output on a lead 132. The major frame detect block 110 also provides frame alarm output signals on this same set of three leads so that a frame fault can be identified as to a specific channel of data. The parity tester has an output lead 134 which provides a parity fault pulse output for every frame with a parity error. Again, there are three leads so as to identify the specific channel having the parity error. The major frame detect block 110 has an output lead 136 providing a feedback path through a major frame integrator 30' and returning a signal on lead 140 to another input of the major frame detect block 110. The minor frame integrator 28' is connected between output lead 128 of minor frame detect block 108 and an input lead 142 of the minor frame detect block 108 in a minor frame feedback path.

Figure 4A:
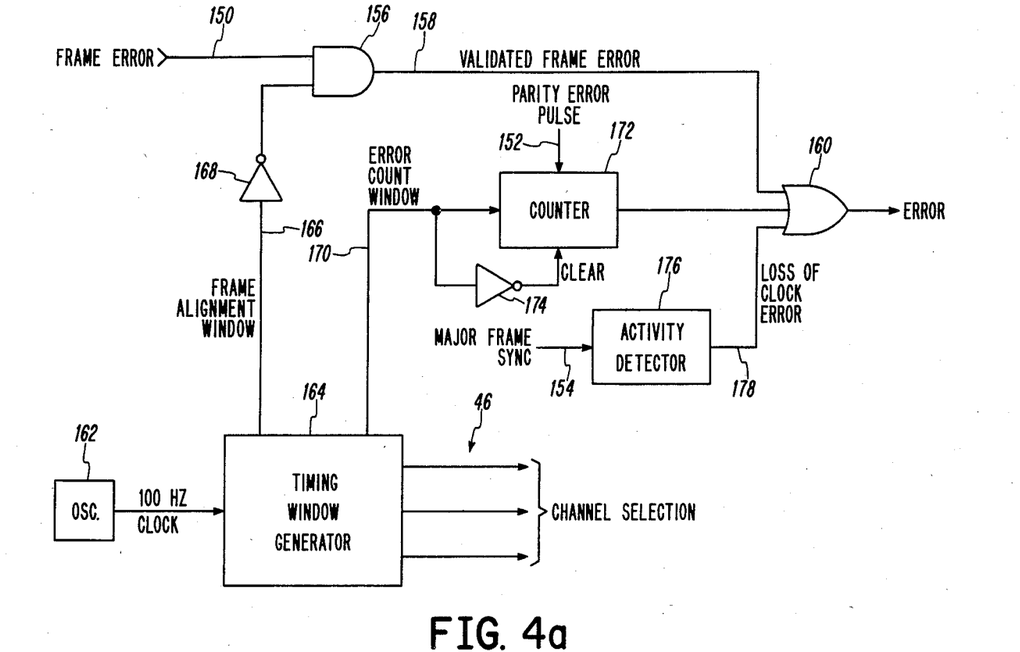
FIG. 4a is a block diagram of the error register portion of FIG. 1.

FIG. 4a provides more detail as to error register 38 of FIG. 1. In this figure, an input lead 150 which is entitled framing error, corresponds to lead 32 in FIG. 1. The parity error input lead labeled 152 corresponds with lead 34 in FIG. 1 while the major frame sync lead 154 corresponds to a similar lead 36 in FIG. 1. Lead 150 goes to an AND gate 156 which has a validated frame error lead 158 output to an OR gate 160. An oscillator 162 supplies clock signals to a window generator block 164 which provides a frame alignment window output signal on lead 166 to an inverter 168. The output of inverter 168 provides a second input to AND gate 156. The timing generator block 164 corresponds generally to that of block 44 in FIG. 1 and provides the channel selection output signals on a set of leads generally designated as 46. A further output entitled error count window on a lead 170 from timing generator 164 is supplied to a counter 172 which receives signals on lead 152 as a further input. The signal on 170 is inverted in an inverter 174 and supplied as a "clear" input signal to the counter 172. An output lead of counter 172 provides further signals to the OR gate 160 when the counter detects five or more errors in a given test period. The major frame sync signal on 154 is supplied to an activity detector 176 which provides output signals on a lead 178 to a third input of OR gate 160. The output of OR gate 160 is a general error signal which, through the logic of the channel selection leads 46, is supplied to the appropriate output labeled 40 from error register 38 in FIG. 1.

Figure 4B:
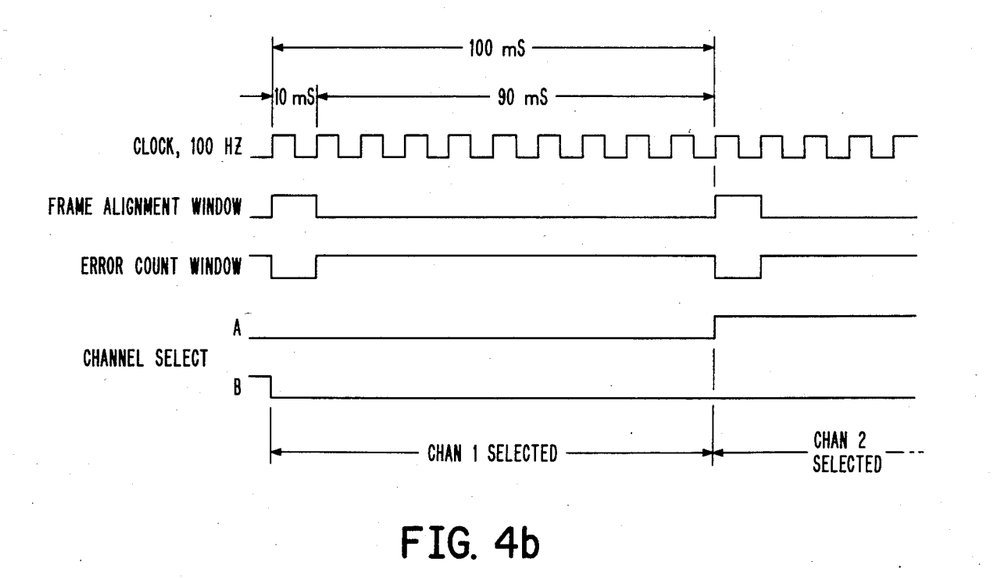

In FIG. 4b a set of waveforms are shown each of which are labeled and illustrate the relative logic values of different leads in FIG. 4a.

Figure 5:
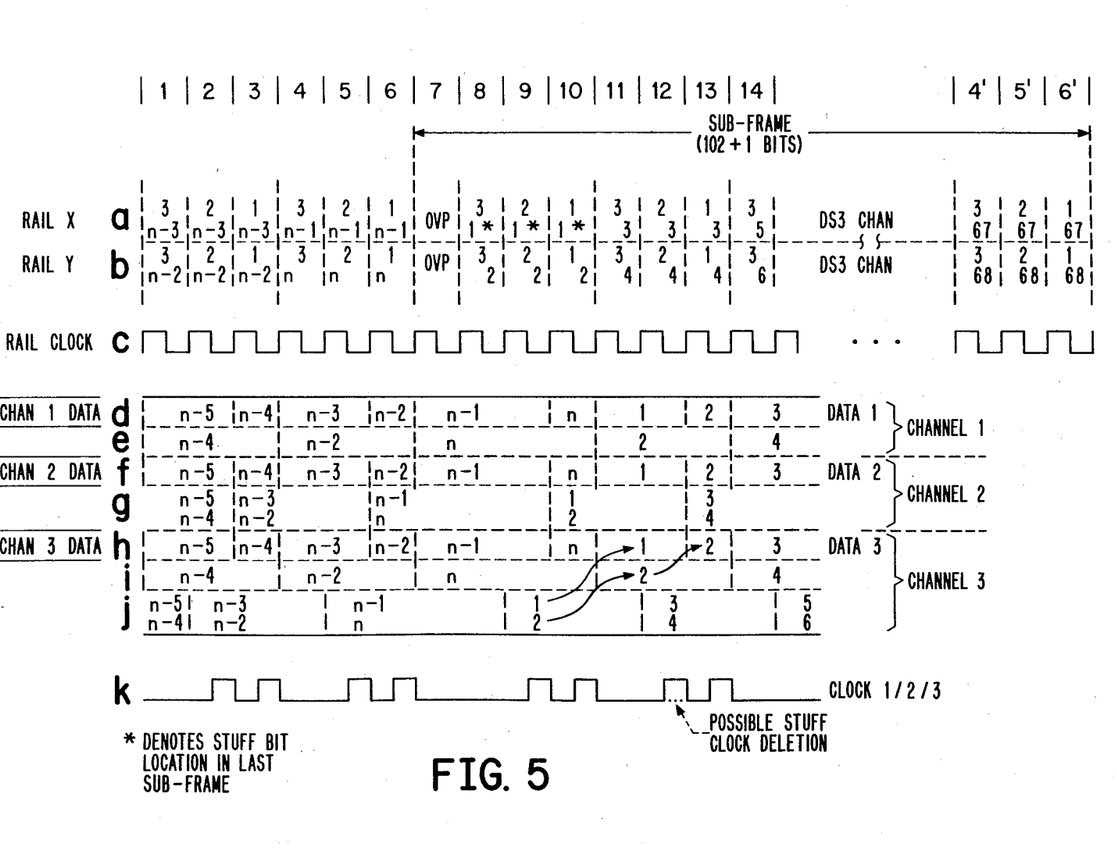
FIG. 5 is a set of waveforms used in explaining the operation of the other figures.

In FIG. 5 a plurality of time periods from 1 through 14 are illustrated for each of a plurality of waveforms or logic value indications from a through k. The numeric values 4', 5' and 6' are used to indicate a repeating of previous information for corresponding time periods.

As illustrated, a rail clock is shown in waveform c of FIG. 5. Waveform a, in time period 1, illustrates that n−3 data for channel 3 is being received. Waveform b, for the same time period, shows the second to the last bit for that same channel 3. The timing or length of the data bit period continually changes as shown. The overhead bit in time period 7 commences a set of information for all of the data bits for a subframe.

In waveform d of FIG. 5 the data appearing at the output of channel 3 in the set of leads 16 in FIG. 2 is illustrated and the nonsymmetricalness of this data is shown since bit n−5 is output on one of the leads 16 for time periods 1 and 2 while n−4 is output only for a single clock time period. In similar fashion, the remaining bits alternate between a long time period of two or three clock periods and a single clock period. The occurrence of three clock periods for a bit arises when the overhead bit, as shown in time period 7, occurs. As illustrated, the data for channel 1 occurring in time period 3 is transferred into the main data channel and to a single register in time period 4. At the beginning of time period 6, the data from an auxiliary register represented by waveform e, is transferred into the main data stream for channel 1. For the channel 2 data, the information is transferred during time period 3 into two auxiliary registers and then in time period 4 the information from one auxiliary register is transferred into the main data stream and in time period 6 the remaining data bit data n−2 from the set of auxiliary registers is transferred into the main channel 2 data stream. In a similar manner, the channel 3 data requires three auxiliary registers since the transfer of the channel 3 data occurs during time period 2 and at this time the n−4 data bit still has not been transferred to the main data stream. Rather, this n−4 bit is transferred at time period 3. At time period 4 the information from the registers designated in waveform j are transferred to the main data channel and to the register shown or illustrated by waveform i. The n−2 data bit is then transferred to the main data stream at time period 6. The arrows shown in time periods 9 through 13 illustrate the action described above for channel 3 since it is more complicated than the other two channels. While the overhead bit of time period 7 causes greater than normal nonsymmetry of the data, the stuff bits occasionally occurring in waveform k cause additional nonsymmetry of the data. The present invention detects the occurrence of a stuff bit and deletes the stuff bit logic level indications from active monitoring for the purpose of detecting errors. The stuff bits do not affect the frame error, loss of clock error detection, or the parity error detection apparatus because the stuff bits were not originally used by the multiplex equipment in the frame or parity generation process.

OPERATION

As previously indicated, the present inventive concept involves using the data from multiplex equipment, demultiplexing same and monitoring this demultiplexed data without attempting to "smooth" the data by removing extraneous frequency components and overhead bits. This is accomplished by using the timing signals originally used by the multiplex equipment to multiplex the data in the first place, thereby eliminating the circuitry typically required for synthesizing these signals. Through the use of the timing signals from the multiplex equipment, the apparatus can utilize the data directly, even though in nonsymmetrical format, and do the checking of parity, framing and loss of clock signal directly. By using time multiplexing techniques, a single set of circuitry can be used for each of a plurality of channels.

This concept is shown generally in FIG. 1 where the apparatus of FIG. 1 monitors the data output from multiplex equipment 10. Demultiplex unit 14 receives the data, clock and other timing signals from the multiplex equipment and outputs data on a set of leads 16 and clock signals on a corresponding set of leads 18. As illustrated, the equipment is set up to monitor three channels of data. However, the equipment can be modified to accept any number of channels since the concept is not channel limited. One embodiment of the inventive concept was designed to select between two and three channels of information and thus the lead 42 is shown in FIG. 1. However, this selection is not incorporated in the more detailed block diagrams of FIGS. 2 through 4.

The demultiplex block 14 internally extracts overhead data from the X rail line and outputs this to the minor frame integrator 49. This minor frame integrator might also be called a frame pattern detector since it is looking for an alternating set of one zero one logic bits in a given relative time bit position. The timing signals obtained from the multiplex equipment greatly decrease the time required to detect the signal and stabilize the integrator to provide a return signal indicating that the demultiplex equipment is in sync with the incoming data and the overhead bits contained therein. The data and clock outputs are provided on the set of leads 16 and 18. At this point in time, the data is an exact bit-for-bit representation of the NRZ (nonreturn to zero) DS3 (digital signal level three) bits on each channel although the timing is irregular as illustrated in FIG. 5 for timing diagrams d, f and h. The block 44 selects each channel of data and its associated clock for 100 milliseconds in consecutive order as illustrated in FIG. 4b. The first 10 milliseconds of this time slot is spent in synchronizing the data framing block 26 to the incoming data and the remaining 90 milliseconds of each of the sampling times is spent detecting errors. The number of parity error pulses is counted during this 90 millisecond period and in one embodiment of the invention, if the number of error pulses counted equals or exceeds five, an output signal is provided on lead 34 indicating a parity error. If the minor frame integrator 28 cannot lock onto a minor frame (subframe), a framing error signal is output on lead 32. The loss of frame sync for the major frame integrator 30 will also introduce an output on lead 32. If there is no clock signal for one reason or another, the set of dividers of the clock signal within block 26 will fail to provide an output major frame sync signal on lead 36 and circuitry within the error register 38 will convert this indication to an error output due to loss of clock signal, if appropriate. The channel selection signal from block 44 is input on lead 46 to error register 38 so that the error signal is routed to the correct channel error indicator on the set of leads 40. In other words, when the switch 20 is in the uppermost position, any error signals are output to the channel 1 error line in the set of leads 40. A set of leads 47 provide frame alignment window signals and error count window signals as illustrated in FIG. 4b to assist the error register in ascertaining whether apparent errors are actual errors. If desired, the parity error rate selection lead 48 may be utilized to change the number of parity error count pulses counted during a 100 millisecond check period from the previously mentioned five counts to some other number. Such a rate selection is optional and is not illustrated in the more detailed block diagrams since this function can either be hard wired or signal selected. It should be noted that while the occurrence of an indicated parity error does not require that there be a bit error, it has been found statistically that greater than 99 percent of the time a parity error results from a failure in the multiplex equipment (i.e., less than 1% of multiplex failures are undetectable using this method). Therefore, this approach to attempting to detect bit errors has been found to work very well for error indication.

It should be noted before continuing to the remaining figures that the comments with respect to frames can get confusing because the overhead bits as seen by the demultiplex unit block 14 and the framing length can be and typically is different from the framing as seen by the violation monitor and removal block 26. The demultiplex unit 14 in one embodiment of the invention, had an overhead bit every 103rd logic bit position. These overhead bits and stuff bits are removed and only the data represented in waveforms d, f and h of FIG. 5 are passed to the block 26. Within block 26, a detection operation occurs to detect the framing bit or overhead bit every 170 clock occurrences. Thus, even though the blocks 28 and 49 are both recited as minor frame integrators, they have different circuitry and operate in different time frames.

Reference will now be made to FIG. 2 which was previously discussed as being a more detailed block diagram of blocks 14 and 49 in FIG. 1. As illustrated, the rail X and rail Y data are supplied to the overhead extractor 60 which comprises two identical circuits for providing the function of locating the overhead bits for each output overhead channel. Nonreturn to zero data is provided for each overhead channel with an associated, common "low speed clock". The overhead extractor is primarily operating in conjunction with the overhead counter 66, frame sync detector 62, frame pattern detector 74, and clock generator 70 to generate a clock of the type shown in waveform k of FIG. 5 whereby data bits are eliminated from consideration by the block 26. The descramblers 52 and 56 decode the incoming two rail data. This data is synchronized using the rail clock and the major frame pulse information from the multiplexing equipment in the descrambling process. The data is encoded in the multiplexer being monitored by two identical scramblers. When the data is output from 52, it is supplied to the data demultiplexer 58 whereby the data is altered from two physical lines to the three physical streams of data as shown in the timing diagrams of FIG. 5. As illustrated, the output signal from the overhead counter 66 not only deletes the clock bits from clock generator 70 but also deletes the data bits from the data demux 58 so that not only are the clock bits eliminated for overhead information but the overhead data bits themselves are eliminated from even being output. This, of course, applies only to the overhead bits used in multiplexing the data on the two channels, rail X and rail Y. These, as previously mentioned, are not the overhead bits involved in the frame and subframe combinations within each of the channels 1 through 3 since, to the circuitry of FIG. 2, these overhead bits merely appear to be data.

In FIG. 3 it will be observed that the appropriate data channel and corresponding clock channel are selected in blocks 100 and 102 and directed to blocks 108 and 116, respectively. The clock signal is divided down by the various dividers to obtain an output signal on lead 124 which is indicative of the major frame sync signal. The primary purpose of this signal is to ascertain whether or not the clock is there or has been lost completely. Thus, there is an output pulse once each frame if the clock has not been lost. The minor frame detector (108 and 28') will synchronize with the incoming data during the 10 millisecond window as illustrated in FIG. 4b and provide an inhibit signal to the clock divider 116 to prevent the counting until synchronization is obtained. A signal is output on lead 130 from minor frame detector 108 to the divide by eight block 120 when a minor frame is detected, causing the divide by 8 unit 120 to properly time align the divide by 7 unit 122 to the minor frame. The minor frame detector 108 and the integrator 28' operate in a feedback mode to ascertain whether the proper combination of framing bits have occurred or whether the next data bit should be checked. Typically, the synchronization procedure of the frame detect circuit 108 requires only one quarter of the 10 millisecond frame alignment window. On the rare occasions when it takes more than 10 milliseconds, the indication is merely temporary and can be cleared up on the next check procedure. The major frame detector 110 detects the occurrence of the proper sequence of data bits in the major frames or combination of subframes and provides the same kind of feedback loop with integrator 30'. If either of the blocks 108 or 110 detect that synchronization has not been obtained during the 10 millisecond alignment window or if after alignment has occurred the framing pattern is lost, an output signal is provided on lead 132 to indicate a framing error. The parity tester block 112 takes the incoming data and during the 90 millisecond detection window, checks the parity of the incoming bits and if the parity does not check, provides parity error outputs on lead 134.

FIG. 4a illustrates in more detail the contents of blocks 44 and 38 in FIG. 1 and shows that if a frame error signal comes in on lead 150 at the same time that the frame alignment window is occurring, the inverter 168 prevents the signal from being output on lead 158. Any other time, however, the occurrence of a frame error on 150 will be output to the output of OR gate 160. The channel selection leads 46 operate gates not shown so that the output of OR gate 160 will be on the proper error lead in the set of leads 40 of FIG. 1. The error count window signal on lead 170 not only clears the counter 172 to a zero but prevents it from counting until the end of the 10 millisecond time. After this time, it counts the number of parity error pulses and if it exceeds a predetermined minimum, an output is provided to the OR gate 160 so as to be output on the appropriate channel error lead. In a similar manner, if the activity detector 176 does not receive a major frame sync pulse often enough within a prescribed time, an output is provided on lead 178 to the OR gate 160 to indicate that there is a loss of clock signal.

Although I have described one embodiment of an inventive concept, I do not wish to be limited to this single embodiment. Rather, I wish to be limited only by the concept of demultiplexing the output of a multiplexer to be monitored through the use of timing signals obtained from the multiplexer to obtain nonsymmetrical data and clock signals, as opposed to the more complicated approach of time redistributing the data and clock signals to produce a new set of symmetrical signals, and then checking this nonsymmetrical data and clock for framing bit and parity bit violations and finally generating error signals when checking signifies that such violations have occurred.

Such concept is outlined in more detail in the following claims wherein I claim:

1. The method of checking for data transmission errors generated by high speed multiplexing equipment at a transmitter end of a communication system comprising the steps of:
   demultiplexing a multiplexed data stream to regenerate time duration nonsymmetrical data along with nonsymmetrical associated clock timing signals both having irregular timing due to removal of overhead information bits from data stream;
   detecting framing information from the regenerated data and generating frame fault error signals when said framing information is not detected; and
   detecting parity of said regenerated data and generating parity error signals when indicated parity is not correct for a given channel of data.

2. Apparatus for checking for data transmission errors generated by high speed multiplexing equipment at transmitter end of a communication system comprising, in combination:
   first means for supplying a multiplexed data stream from the equipment to be monitored along with timing signals for use in demultiplexing said multiplexed data;
   second means, connected to said first means for receiving said data and timing signals therefrom, for demultiplexing the multiplexed data to regenerate time duration nonsymmetrical data along with nonsymmetrical associated clock timing signals both having irregular timing due to removal of overhead information bits from the data stream;
   third means, connected to said second and first means for receiving data and timing signals therefrom, for detecting framing information from the regenerated data and generating frame fault error signals when said framing information is not detected; and
   fourth means, connected to said second means for receiving data therefrom, for detecting parity of said regenerated data and generating parity error signals when indicated parity is not correct for a given channel of data.

3. The method of checking for correct operation of multiplexing equipment using the data to be transmitted from that equipment comprising the steps of:
   generating a plurality of data channels of nonsymmetrical data signals and a like plurality of nonsymmetrical clock timing signals by demultiplexing previously multiplexed data using rail clock, framing and stuff bit signals obtained directly from the multiplexing equipment to help generate said signals, nonsymmetry of the data and clock signals being caused by removal of overhead and stuff bits during demultiplexing;
   monitoring the nonsymmetrical demultiplexed data for framing bit and parity bit violations; and
   generating error signals when said violations occur.

4. The method of claim 3 comprising the additional step of time multiplexing the monitoring operation between said plurality of generated nonsymmetrical data signals.

5. The method of checking for data transmission errors generated by high speed multiplexing equipment at a transmitter end of a communication system comprising the steps of:

demultiplexing previously multiplexed data which data includes overhead information bits to regenerate time duration nonsymmetrical data along with nonsymmetrical associated clock timing signals both having irregular timing due to removal of overhead information bits from the data stream; and checking said nonsymmetrical data using timing information supplied from the multiplexing equipment and generating error signals when said data stream does not conform to predefined parameters.

* * * * *